US012606199B2

(12) United States Patent
Lee et al.

(10) Patent No.: US 12,606,199 B2
(45) Date of Patent: Apr. 21, 2026

(54) SYSTEM ON CHIP, AUTONOMOUS DRIVING SYSTEM INCLUDING THE SAME, AND OPERATING METHOD THEREOF

(71) Applicant: SAMSUNG ELECTRONICS CO., LTD., Suwon-si (KR)

(72) Inventors: Seunghan Lee, Suwon-si (KR); Seungcheol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 18/368,381

(22) Filed: Sep. 14, 2023

(65) Prior Publication Data

US 2024/0270278 A1     Aug. 15, 2024

(30) Foreign Application Priority Data

Feb. 15, 2023    (KR) ........................ 10-2023-0020122

(51) Int. Cl.
| | |
|---|---|
| *B60W 60/00* | (2020.01) |
| *B60W 40/09* | (2012.01) |
| *B60W 50/00* | (2006.01) |
| *B60W 50/04* | (2006.01) |
| *B60W 50/10* | (2012.01) |

(52) U.S. Cl.
CPC .......... *B60W 60/001* (2020.02); *B60W 40/09* (2013.01); *B60W 50/045* (2013.01); *B60W 50/10* (2013.01); *B60W 2050/0083* (2013.01)

(58) Field of Classification Search
CPC .. B60W 60/001; B60W 40/09; B60W 50/045; B60W 50/10; B60W 2050/0083
See application file for complete search history.

(56) References Cited

U.S. PATENT DOCUMENTS

| | | | |
|---|---|---|---|
| 11,345,359 | B2 | 5/2022 | Zhu |
| 2021/0001880 | A1 | 1/2021 | Hu |
| 2021/0053569 | A1 | 2/2021 | Censi et al. |
| 2021/0245745 | A1 | 8/2021 | Wang |
| 2021/0291843 | A1* | 9/2021 | Zhu ..................... B60W 50/085 |

(Continued)

OTHER PUBLICATIONS

Wintersberger et al., "Towards a Personalized Trust Model for Highly Automated Driving", ResearchGate, Sep. 2016, 8 total pages.

*Primary Examiner* — Andrew J Cromer
(74) *Attorney, Agent, or Firm* — Sughrue Mion, PLLC

(57) ABSTRACT

A system on chip (SoC), an autonomous driving system including the same, and an operating method thereof is provided. The autonomous driving system includes: a first SoC configured to receive, in a manual driving mode of a vehicle, pieces of sensor information from sensors mounted on the vehicle and generate first information indicating manual driving characteristics of a driver by processing the pieces of sensor information and manual operation information generated when the driver operates the vehicle; and a second SoC configured to receive the pieces of sensor information, generate, in the manual driving mode, second information including one or more setting values for controlling the vehicle according to an autonomous driving function, and correct in real-time the one or more setting values related to the autonomous driving function by comparing, in the manual driving mode, the first information to the second information.

18 Claims, 12 Drawing Sheets

(56)          References Cited

U.S. PATENT DOCUMENTS

| | | | |
|---|---|---|---|
| 2022/0153294 A1* | 5/2022 | Wu | B60W 60/001 |
| 2022/0315014 A1 | 10/2022 | Fields et al. | |
| 2022/0342782 A1 | 10/2022 | Kim | |
| 2023/0042206 A1* | 2/2023 | Gao | A61B 5/0077 |

* cited by examiner

| Condition | SoC 1 OPERATION VALUE | SoC 2 CALCULATION VALUE | DIFFERENCE VALUE | TIME INFORMATION |
|---|---|---|---|---|
| SENSOR INFORMATION | A | A' | A~A' | Time stamp |
| DISTANCE BETWEEN VEHICLES (m) | BRAKE OPERATION POINT (70m) | BRAKE OPERATION POINT (80m) | DIFFERENCE VALUE INFORMATION (10m) | OCCURRENCE DATE AND TIME |

FIG. 9

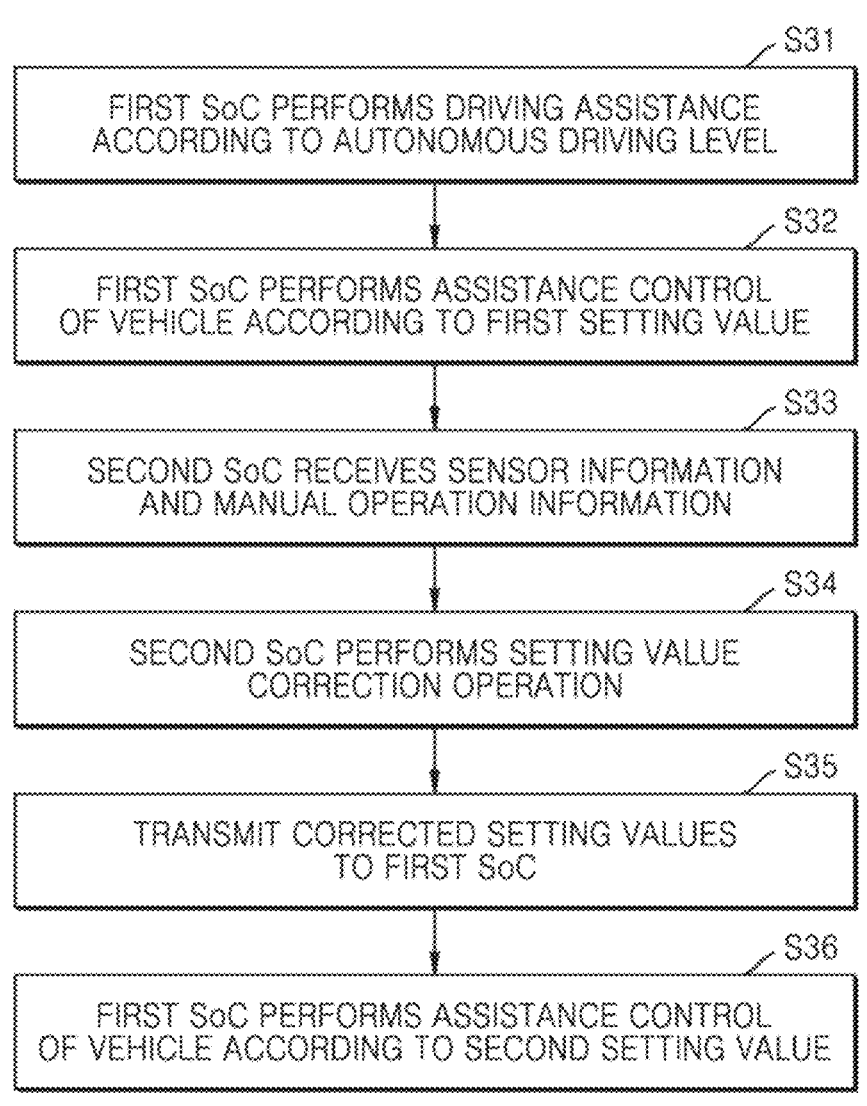

S31
FIRST SoC PERFORMS DRIVING ASSISTANCE
ACCORDING TO AUTONOMOUS DRIVING LEVEL

S32
FIRST SoC PERFORMS ASSISTANCE CONTROL
OF VEHICLE ACCORDING TO FIRST SETTING VALUE

S33
SECOND SoC RECEIVES SENSOR INFORMATION
AND MANUAL OPERATION INFORMATION

S34
SECOND SoC PERFORMS SETTING VALUE
CORRECTION OPERATION

S35
TRANSMIT CORRECTED SETTING VALUES
TO FIRST SoC

S36
FIRST SoC PERFORMS ASSISTANCE CONTROL
OF VEHICLE ACCORDING TO SECOND SETTING VALUE

SYSTEM ON CHIP, AUTONOMOUS DRIVING SYSTEM INCLUDING THE SAME, AND OPERATING METHOD THEREOF

CROSS-REFERENCE TO RELATED APPLICATION

This application is based on and claims priority under 35 U.S.C. § 119 to Korean Patent Application No. 10-2023-0020122, filed on Feb. 15, 2023, in the Korean Intellectual Property Office, the disclosure of which is incorporated by reference herein in its entirety.

BACKGROUND

Embodiments of the present disclosure relate to a system on chip and an autonomous driving system including the same, and more particularly, to a system on chip for correcting an autonomous driving function to be similar to a driver's driving habit, an autonomous driving system including the same, and an operating method thereof.

The purpose of autonomous driving technology is to control driving of a vehicle by recognizing objects and circumstances based on pieces of information from various types of sensors. Systems on chip (SoCs) (e.g., an advanced driver assistance system (ADAS) SoC) for processing pieces of information from various types of sensors are applied to autonomous driving systems, and to ensure the safety of autonomous driving and deal with fault of any one SoC, two or more SoCs may be included in an autonomous driving system.

An autonomous driving control of a vehicle may be performed based on various setting values calculated based on neural network operations or artificial intelligence operations. For example, in case of control of a brake system in a vehicle, a distance between vehicles may be determined based on a plurality of pieces of sensor information and the vehicle may be controlled according to a setting value (e.g., a distance value between vehicles, from which an operation of the brake system starts) corresponding to a certain circumstance and condition while driving. However, because the aforementioned control of the vehicle in an autonomous driving function does not reflect a driver's driving characteristics and habit, some drivers may not satisfy the autonomous driving function, thereby causing a decrease in the reliability of an autonomous driving system.

SUMMARY

Embodiments of the present disclosure provide a vehicle system on chip capable of improving the reliability of an autonomous driving system by correcting the characteristics of autonomous driving to be similar to a driver's driving habit, an autonomous driving system including the same, and an operating method thereof.

According to an embodiment of the present disclosure, an autonomous driving system is provided. The autonomous driving system includes: a first system on chip (SoC) configured to receive, in a manual driving mode of a vehicle, pieces of sensor information from sensors mounted on the vehicle and generate first information indicating manual driving characteristics of a driver by processing the pieces of sensor information and manual operation information generated when the driver operates the vehicle; and a second SoC configured to receive the pieces of sensor information, generate, in the manual driving mode, second information including one or more setting values for controlling the vehicle according to an autonomous driving function, and correct in real-time the one or more setting values related to the autonomous driving function by comparing, in the manual driving mode, the first information to the second information.

According to an embodiment of the present disclosure, an operating method of an autonomous driving system for controlling an autonomous driving function of a vehicle that includes a plurality of sensors is provided. The operating method includes: generating, by a first system on chip (SoC), one or more operation values indicating manual driving characteristics of a driver during manual driving of the vehicle by the driver; generating, by a second SoC and based on pieces of sensor information from the plurality of sensors during the manual driving, one or more setting values related to control of the vehicle according to the autonomous driving function; determining differences between the one or more operation values of the driver and the one or more setting values according to the autonomous driving function during the manual driving; correcting, based on a result of the determining the differences, the one or more setting values such that the one or more setting values becomes closer to the manual driving characteristics of the driver; and controlling autonomous driving of the vehicle based on the corrected one or more setting values in an autonomous driving mode in response to selection of the autonomous driving function.

According to an embodiment of the present disclosure, a system on chip (SoC) is provided. The SoC includes: at least one processor; and memory storing at least one computer program that, when executed by the at least one processor, is configured to: control an autonomous driving function of a vehicle; correct, in a manual driving mode of the vehicle, one or more setting values for controlling the vehicle according to the autonomous driving function, based on comparing first information to second information, wherein the first information indicates manual driving characteristics of a driver of the vehicle and is generated by processing manual operation information generated when the driver operates devices of the vehicle in the manual driving mode, and wherein the second information includes the one or more setting values.

BRIEF DESCRIPTION OF DRAWINGS

Embodiments of the present disclosure will be more clearly understood from the following detailed description taken in conjunction with the accompanying drawings in which:

FIG. 7A illustrates an example of table information for an information processing operation according to embodiments;

FIG. 9 is a second flow chart illustrating an operating method of an autonomous driving system, according to an embodiment;

DETAILED DESCRIPTION

Hereinafter, non-limiting example embodiments of the present disclosure are described in detail with reference to the accompanying drawings. As used herein, an expression "at least one of" or "at least one from among" preceding a list of elements modifies the entire list of the elements and does not modify the individual elements of the list. For example, an expression, "at least one of (or from among) a, b, and c" should be understood as including only a, only b, only c, both a and b, both a and c, both b and c, or all of a, b, and c.

Figure 1:
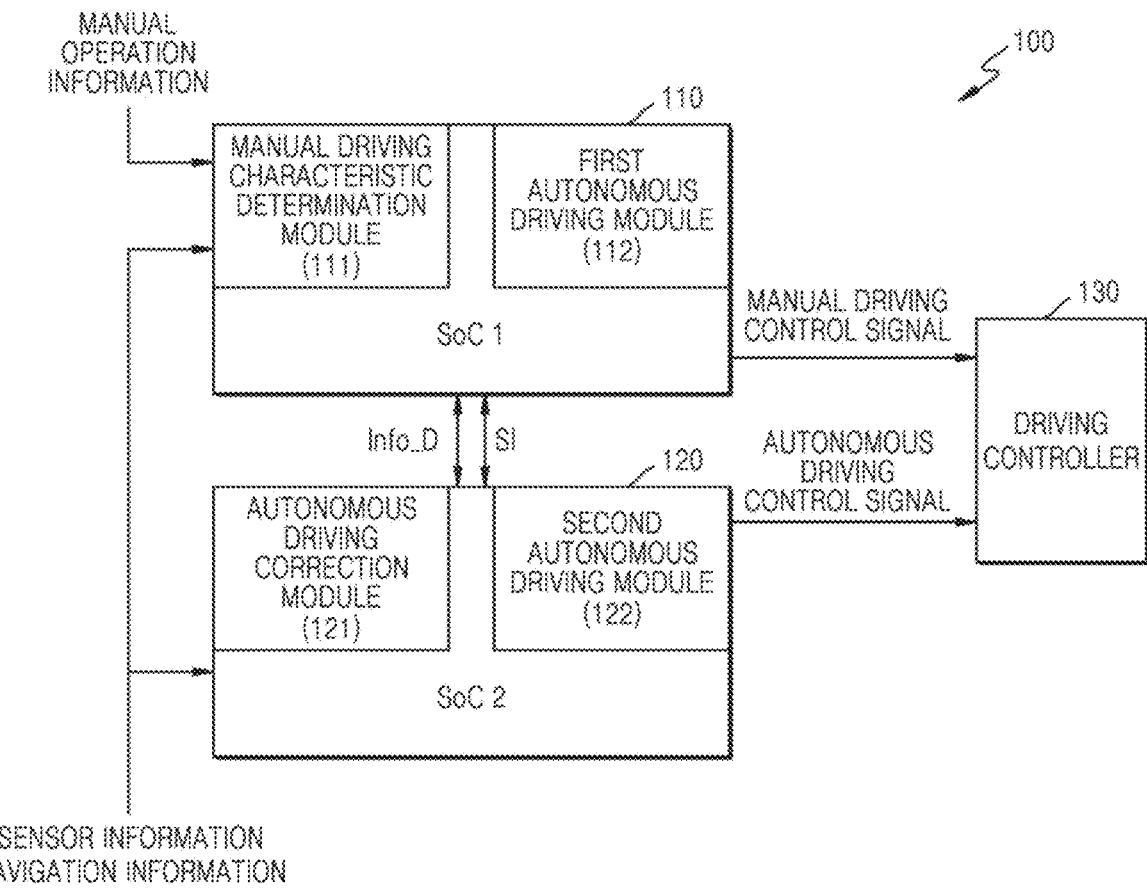
FIG. 1 is a block diagram illustrating systems on chip (SoCs) and an autonomous driving system including the same, according to an embodiment.

FIG. 1 is a block diagram illustrating systems on chip (SoCs) and an autonomous driving system 100 including the same, according to an embodiment.

Referring to FIG. 1, the autonomous driving system 100 may include a plurality of components mounted on a vehicle, and for example, the autonomous driving system 100 may include one or more SoCs configured to control autonomous driving of the vehicle. Although FIG. 1 shows that the autonomous driving system 100 includes a first SoC 110, a second SoC 120, and a driving controller 130, embodiments are not limited thereto. For example, the autonomous driving system 100 may further include an additional SoC and further include a device configured to perform various kinds of control operations related to autonomous driving.

In an embodiment, the first SoC 110 may include a manual driving characteristic determination module 111 and a first autonomous driving module 112, and the second SoC 120 may include an autonomous driving correction module 121 and a second autonomous driving module 122. The first SoC 110 and the second SoC 120 may control the vehicle's autonomous driving in various ways, and for example, if a driver selects any one of a plurality of autonomous driving levels, an autonomous driving function of any one of the first SoC 110 and the second SoC 120 may be selectively driven to control the autonomous driving. Alternatively, in an embodiment, any one of the first SoC 110 and the second SoC 120 may be selectively driven to control autonomous driving and generate an autonomous driving control signal for controlling various kinds of systems in the vehicle, and the other one SoC may perform operation processing for mutual verification of various kinds of information processed in association with the autonomous driving function.

In an embodiment, each of the first SoC 110 and the second SoC 120 may include a system bus to which a protocol having a certain bus standard is applied and include various kinds of intellectual properties (IPs) connected to the system bus. As a standard of the system bus, the advanced microcontroller bus architecture (AMBA) protocol of Advanced RISC Machine (ARM) may be applied. Bus types of the AMBA protocol may include advanced high-performance bus (AHB), advanced peripheral bus (APB), advanced extensible interface (AXI), AXI4, AXI coherency extensions (ACE), and the like. In addition, other types of protocols, such as uNetwork of Sonics Inc., CoreConnect of IBM, and Open Core Protocol of OCP-IP, may be applied. In addition, because the first SoC 110 and the second SoC 120 are employed in the autonomous driving system 100, each of the first SoC 110 and the second SoC 120 may correspond to an advanced driver assistance system (ADAS) SoC.

Each of the first SoC 110 and the second SoC 120 may receive sensor information and navigation information and perform various kinds of control operations for autonomous driving of the vehicle. For example, the sensor information may include pieces of information from various types of sensors mounted on the vehicle. The sensor information may include image information provided from an image sensor, distance information provided from various types of sensors, such as a light detection and ranging (LiDAR) sensor, a radar sensor, a time of flight (ToF) sensor, an ultrasonic sensor, and an infrared sensor, and the like. In addition, the sensor information may further include information provided from at least one of a magnetic sensor, a positioning sensor (e.g., a global positioning system (GPS)), an acceleration sensor, an atmospheric pressure sensor, a temperature/humidity sensor, a proximity sensor, and a gyroscope sensor. In addition, the navigation information may include various kinds of information, such as position information of the vehicle while driving and road information.

Each of the first autonomous driving module 112 of the first SoC 110 and the second autonomous driving module 122 of the second SoC 120 may control autonomous driving according to an autonomous driving level selected by a driver. For example, a plurality of sensors may be mounted on the vehicle, different sensors may be activated according to autonomous driving levels, and as an autonomous driving level increases, more sensors may be activated and more pieces of sensor information may be processed and used for autonomous driving.

When autonomous driving of the vehicle is controlled, autonomous driving information may be generated through a neural network operation or an artificial intelligence operation using the various kinds of sensor information and/or navigation information described above, and automated vehicle driving without intervention of a driver may be performed by using the generated autonomous driving information to control systems in the vehicle. The autonomous driving control signal may be provided to the driving controller 130, and the driving controller 130 may control a steering system, a brake system, a power system, and the like included in the vehicle, in response to the autonomous driving control signal.

The autonomous driving levels may be classified into various levels. For example, in the autonomous driving level classification defined by the Society of Automotive Engineers (SAE), a zeroth level to a fifth level are proposed, wherein the zeroth level indicates no driving automation, the first level indicates driver assistance, the second level indicates partial driving automation, the third level indicates conditional driving automation, the fourth level indicates high driving automation, and the fifth level indicates full driving automation. In addition, the driving responsibility for an accident or the like may vary according to autonomous driving levels, and for example, driving responsibility may belong to a driver at the zeroth level to the second level, while driving responsibility may belong to the autonomous driving system 100 at the third level to the fifth level.

The autonomous driving system 100 may calculate and store setting values for controlling various kinds of systems for steering, brake, power, and the like of the vehicle according to autonomous driving. In addition, in an embodiment, an operation of correcting and updating the setting values may be performed so that the control characteristics of systems in the vehicle according to autonomous driving are similar to a tendency and a habit while the driver is actually driving the vehicle. For example, when the driver directly drives the vehicle (e.g., in a manual driving mode), the driver may operate various devices, such as a brake, a steering wheel, an acceleration pedal, and an emergency light, in the vehicle, and the manual driving characteristic determination module 111 may receive manual operation information according to an operation by the driver on the devices in the vehicle and determine characteristics of the driver operating the devices in the vehicle under various environments, circumstances, and conditions while driving, based on pieces of sensor information and the received manual operation information. For example, in the manual driving mode, pieces of sensor information of at least some of a plurality of sensors mounted on the vehicle may be provided to the first SoC 110, and the driver's manual driving characteristics in various kinds of driving environments which may be determined from the pieces of sensor information may be determined. The first SoC 110 may generate manual driving characteristic information Info_D including information related to the driver's manual driving characteristics for the vehicle, based on a result of the determination.

In an embodiment, the vehicle's autonomous driving characteristics may vary depending on various kinds of setting values defined in the autonomous driving function, and the manual driving characteristic information Info_D may be compared to autonomous driving characteristic information. For example, the manual driving characteristic information Info_D may be compared to the setting values and an operation of correcting the setting values may be performed according to a result of the comparison, so that autonomous driving is similar to or the same as the driver's driving habit. For example, the autonomous driving correction module 121 of the second SoC 120 may perform the correction operation based on comparison between the manual driving characteristic information Info_D from the first SoC 110 and various kinds of information related to the autonomous driving function.

For example, in the manual driving mode, the second SoC 120 may receive pieces of sensor information to be used for autonomous driving of the vehicle, calculate setting values for controlling the vehicle under a certain condition while driving, which is determined from the pieces of sensor information, and generate an autonomous driving control signal for controlling the vehicle according to a result of the calculation. In addition, based on comparison between the manual driving characteristic information Info_D provided from the first SoC 110 and the setting values corresponding to the autonomous driving characteristic information, differences between the driver's manual driving characteristics and autonomous driving characteristics by the autonomous driving system 100 may be determined.

In an embodiment, the autonomous driving correction module 121 may correct the setting values based on the differences between the manual driving characteristic information Info_D and the autonomous driving characteristic information (e.g., the setting values). For example, a distance between vehicles may be defined as a setting value for operating a brake function, and the setting value related to the brake function in autonomous driving may be corrected so that a difference between a distance between vehicles when the driver actually operates a brake and a distance between vehicles when the brake is operated according to the autonomous driving function is reduced. In addition, setting values for controlling the steering system, the brake system, the power system, and the like under various conditions in autonomous driving may be present, and the setting values may be corrected by the autonomous driving correction module 121 to be similar to the driver's driving habit. The corrected setting values may be stored in a storage circuit in the first SoC 110 and/or the second SoC 120 or stored in an external storage device.

Thereafter, when the autonomous driving function is selected by the driver, the second SoC 120 may perform autonomous driving based on the corrected setting values and generate a corrected autonomous driving control signal so that the autonomous driving is similar to the driver's driving habit. In addition, when manual driving is performed again by the driver, various kinds of setting values may be corrected and updated during the manual driving according to the manual driving characteristic determination and autonomous driving correction function described above.

Although it is described with respect to the embodiment shown in FIG. 1 that the first SoC 110 determines manual driving characteristics and the second SoC 120 corrects setting values related to autonomous driving, embodiments are not limited thereto. For example, each of the first SoC 110 and the second SoC 120 may include both a manual driving characteristic determination module and an autonomous driving correction module, and an SoC configured to determine manual driving characteristics and an SoC configured to perform autonomous driving correction may be randomly selected. For example, in the manual driving mode of the vehicle, the second SoC 120 may determine the driver's manual driving characteristics, and the first SoC 110 may perform an autonomous driving correction operation. Alternatively, any one of the first SoC 110 and the second SoC 120 may perform both the manual driving characteristic determination and the autonomous driving correction operation. In addition, when the autonomous driving function is selectively performed by the first SoC 110 and the second SoC 120, corrected setting values SI according to the embodiment described above may be shared by the first SoC 110 and the second SoC 120 through communication between the first SoC 110 and the second SoC 120.

Although it is described in the embodiment shown in FIG. 1 that a control of the vehicle is performed by providing a manual driving control signal from the first SoC 110 to the driving controller 130 in the manual driving mode, embodiments are not limited thereto. For example, the driver may directly control the steering system, the brake system, the power system, and the like by operating devices, such as the brake and the steering wheel, in the vehicle, and a result obtained by detecting the driver's operation on the devices may be provided as manual operation information to the first SoC 110.

In addition, although it is described with respect to the embodiment shown in FIG. 1 that the autonomous driving correction function is performed by SoCs, embodiments are not limited thereto. For example, the autonomous driving system 100 may further include a component configured to receive manual driving characteristic information and autonomous driving characteristic information from the first SoC 110 and the second SoC 120, and the setting values according to the embodiments described above may be corrected based on operation processing of the additionally included component. The corrected setting values may be provided to the first SoC 110 and the second SoC 120 and used for the autonomous driving function or stored in a storage included in the autonomous driving system 100.

According to the embodiment described above, because autonomous driving by an autonomous driving system is similar to a driver's actual driving habit, the driver's comfort, satisfaction, and the like in vehicle control while performing the autonomous driving function may increase, and accordingly, the driver's confidence in the autonomous driving system may be improved. That is, a decrease in the reliability of an autonomous driving system, which may occur according to differences between autonomous driving characteristic and a driver's driving habit, regardless of the safety of autonomous driving, may be prevented.

Figure 2:
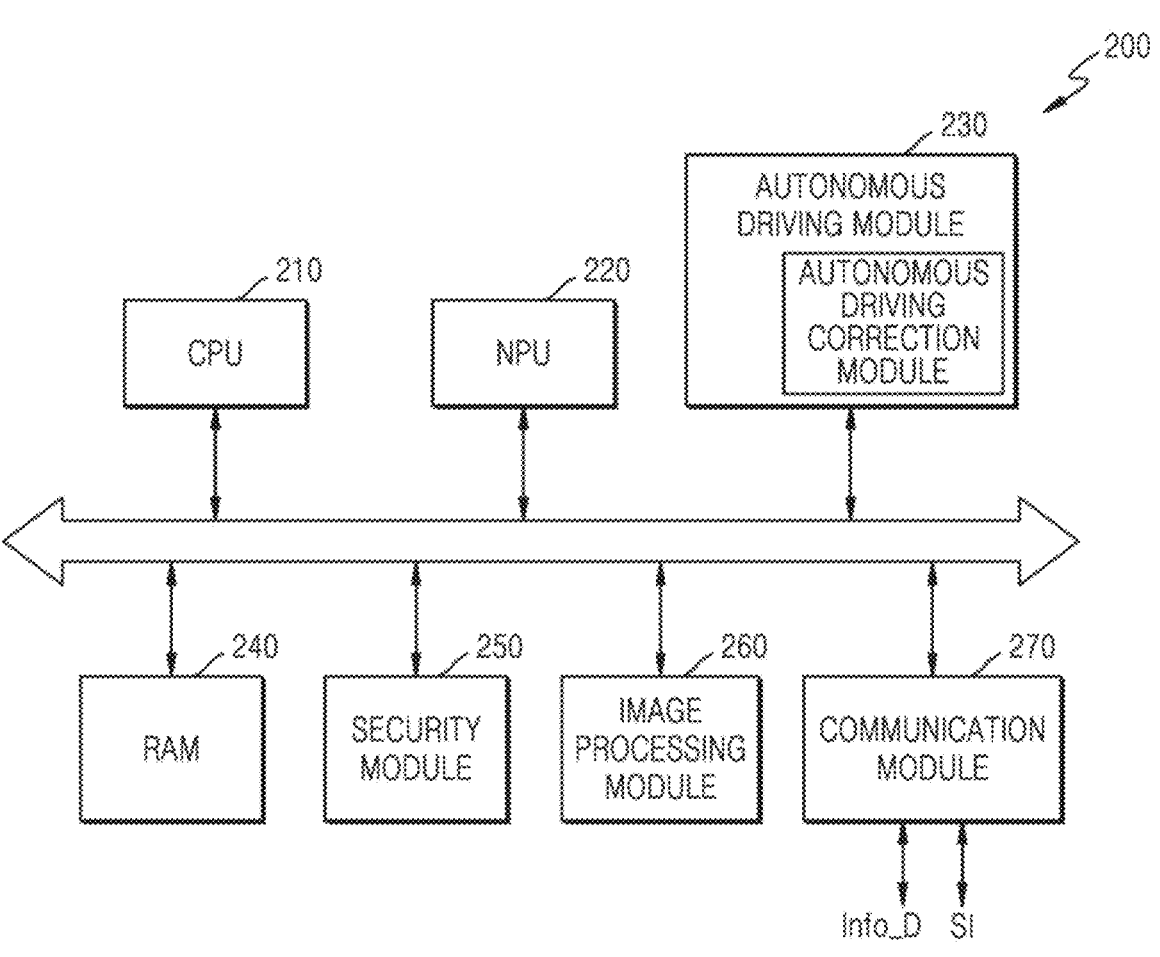
FIG. 2 is a block diagram illustrating an SoC according to embodiments.

FIG. 2 is a block diagram illustrating an SoC 200 according to embodiments. The SoC 200 of FIG. 2 may correspond to the first SoC 110 or the second SoC 120 in the embodiment described above.

The SoC 200 may include one or more processors, and each processor may include a single core or multiple cores. For example, the SoC 200 may include a central processing unit (CPU) 210 and a neural processing unit (NPU) 220. Although FIG. 2 shows that the CPU 210 and the NPU 220 are included, other types of processors may be included in the SoC 200, and for example, a graphics processing unit (GPU) as a general processor may be included in the SoC 200, or an application-specific integrated circuit (ASIC), a tensor processing unit (TPU), a neural engine, and the like as dedicated processors related to a neural network operation may be included in the SoC 200.

In addition, according to embodiments, the SoC 200 may further include an autonomous driving module 230, random access memory (RAM) 240, a security module 250, an image processing module 260, and a communication module 270. The RAM 240 may temporarily store programs, data, or instructions, and each of the CPU 210 and the NPU 220 may perform unique functions according to execution of the programs by executing the programs stored in the RAM 240.

Although it is shown in the embodiment illustrated in FIG. 2 that the autonomous driving module 230, the security module 250, and the image processing module 260 are individual components, each of the autonomous driving module 230, the security module 250, and the image processing module 260 may be implemented by the same or different hardware, software, or a combination thereof. For example, features implemented by software in the autonomous driving module 230, the security module 250, and the image processing module 260 may correspond to a set of programs stored in the RAM 240. In a description of embodiments below, performing functions related to sensor information processing and autonomous driving by each of the autonomous driving module 230, the security module 250, and the image processing module 260 may indicate that one or more processors execute the autonomous driving module 230, the security module 250, and the image processing module 260.

While performing autonomous driving, various kinds of neural network operations of convolutional neural networks (CNNs), recurrent neural networks (RNNs), deep belief networks, restricted Boltzmann machines, and the like may be performed using pieces of information provided from various kinds of sensors, and various kinds of information, such as a voice recognition signal, an object recognition signal, an image recognition signal, and a biometric information recognition signal, may be generated from results of the neural network operations. In addition, pieces of driving information related to autonomous driving of a vehicle may be generated through various kinds of neural network operations based on the generated pieces of information. For example, a steering system, a brake system, a power system, and the like included in the vehicle may be controlled based on various kinds of recognition results of a voice, an object, and/or the like.

The communication module 270 may communicate with an external device, for example, perform communication in a vehicle to vehicle (V2V), vehicle to infrastructure (V2I), vehicle to pedestrian (V2P), or vehicle to nomadic device (V2N) scheme or perform short-range or long-range communication, such as third generation (3G), long term evolution (LTE), Wi-Fi, Bluetooth, Bluetooth low energy (BLE), Zigbee, or near field communication (NFC). In addition, when the SoC 200 performs the autonomous driving correction function according to the embodiments described above, the autonomous driving module 230 may include an autonomous driving correction module and perform a correction operation by using the manual driving characteristic information Info_D provided from another external SoC. Although not shown in FIG. 2, the autonomous driving correction module may be performed in another external SoC and the SoC 200 may receive the corrected setting values SI in the embodiment described above.

The security module 250 may perform security processing on various kinds of sensor information provided to the SoC 200. For example, to prevent a risk due to forged sensor information in autonomous driving, security may be ensured through encryption/decryption processing on sensor information, and the security module 250 may check whether received pieces of sensor information are forged through encryption/decryption processing on the pieces of sensor information. In addition, the image processing module 260 may perform a processing operation on image information among pieces of sensor information from the outside and provide, for example, detection/recognition information of various kinds of objects included in an image. The autonomous driving module 230 may control an autonomous driving operation based on the detection/recognition information of the various kinds of objects from the image processing module 260.

According to embodiments, an autonomous driving system or an SoC may include a storage storing information in a nonvolatile manner, and for example, the storage may include read-only memory (ROM), flash memory, phase-change RAM (PRAM), magnetic RAM (MRAM), resistive RAM (RRAM), ferroelectric RAM (FRAM), or the like. In addition, various kinds of modules configured to perform the autonomous driving function according to embodiments may be stored in the storage, and when an autonomous driving system is driven, the various kinds of modules may be loaded in the RAM 240 in the SoC 200.

Figure 3:
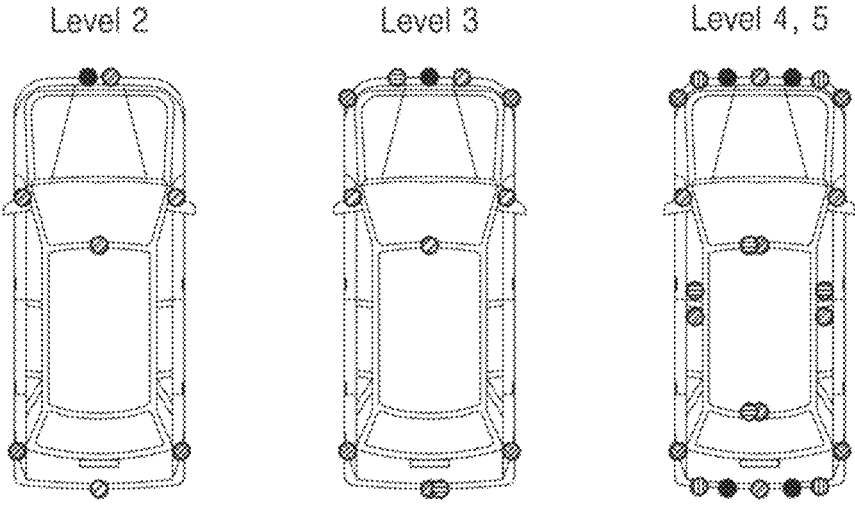
FIG. 3 is a conceptual diagram illustrating an example of processing sensor information according to autonomous driving levels.

FIG. 3 is a conceptual diagram illustrating an example of processing sensor information according to autonomous driving levels.

Referring to FIG. 3, LiDAR sensors and radar sensors may be classified into various types according to effective measurement distances, and for example, a vehicle may include one or more long-range radar sensors and short-range radar sensors as radar sensors and include one or more long-range LiDAR sensors and short-range LiDAR sensors as LiDAR sensors. In addition, the vehicle may include a plurality of image sensors and further include various other types of sensors, such as an acceleration sensor and a proximity sensor. According to embodiments, only some sensors among a plurality of sensors included in the vehicle may be selectively activated according to an autonomous driving level selected by a driver, and as an autonomous driving level increases, more sensors may be activated.

In addition, in embodiments, even when the manual driving mode is set for the vehicle, sensors according to a certain autonomous driving level among the plurality of sensors mounted on the vehicle may be activated, and any one SoC may process an operation related to an autonomous driving function by using sensor information. In addition, according to the embodiments described above, in the manual driving mode of the vehicle, setting values may be corrected in real-time according to the driver's manual driving characteristics, and the corrected setting values may be updated and stored.

Figure 4:
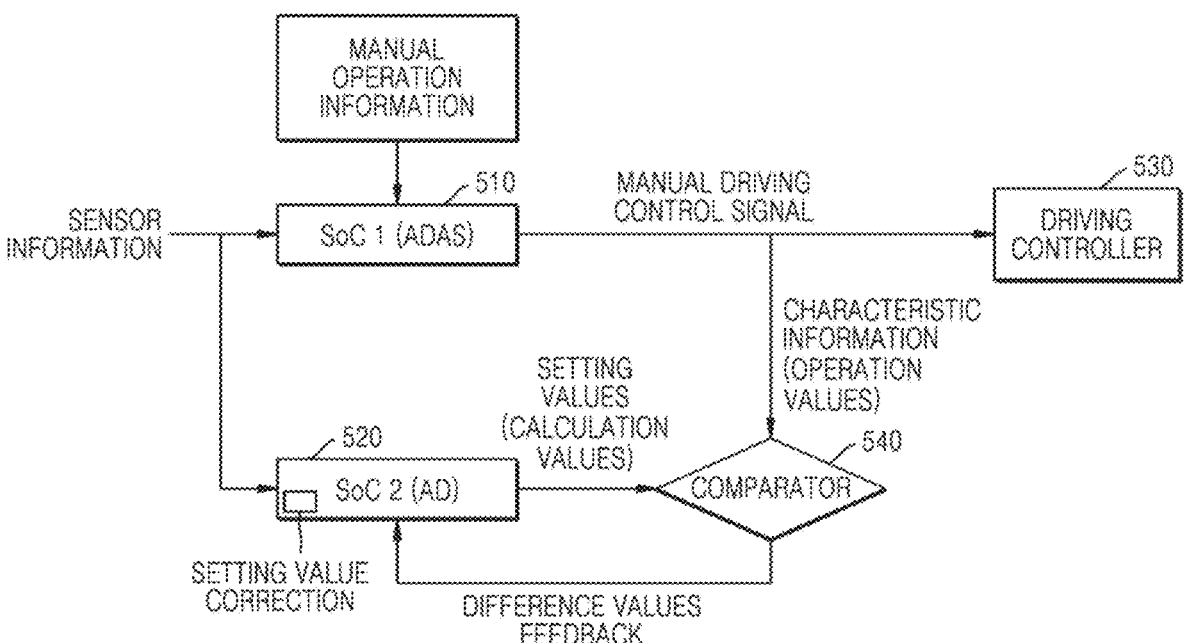
FIG. 4 is a block diagram schematically illustrating a correction function in an autonomous driving function according to embodiments.

FIG. 4 is a block diagram schematically illustrating a correction function in an autonomous driving function according to embodiments.

Referring to FIG. 4, an autonomous driving system may include a plurality of SoCs, including a first SoC 510 and a second SoC 520, and each of the first SoC 510 and the second SoC may correspond to an ADAS SoC. In addition, the first SoC 510 may receive a driver's manual operation information during the driver's manual driving and output, in response to the received manual operation information, a manual driving control signal for controlling systems in a vehicle. In addition, the second SoC 520 may receive pieces of sensor information in the manual driving mode, perform operations related to an autonomous driving function AD, and generate setting values (or calculation values) defined to control the systems in the vehicle for the correction operation in the embodiment described above.

In an embodiment, the first SoC 510 and the second SoC may perform, in parallel, operation processing of the pieces of sensor information. The first SoC 510 may determine a certain circumstance, environment, and condition during manual driving based on a processing result of the pieces of sensor information and determine the driver's characteristics of operating devices in the vehicle under the condition by processing the manual operation information. For example, the first SoC 510 may provide a manual driving control signal for controlling various systems in the vehicle based on the driver's manual operation information and simultaneously provide the driver's characteristic information (operation values) to a comparator 540 to correct the setting values.

The comparator 540 may provide information (difference values) indicating differences between the driver's driving habit and driving characteristics by the autonomous driving system, based on comparison between the driver's characteristic information (the operation values) from the first SoC 510 and the setting values (or the calculation values) from the second SoC 520. The difference values according to a result of the comparison may be fed back to the second SoC 520, and the second SoC 520 may correct at least some of the setting values related to the autonomous driving function, based on the fed-back difference values.

In the example shown in FIG. 4, although the comparator 540 is outside the first SoC 510 and the second SoC 520, the comparator 540 may be included in at least one from among the first SoC 510 and the second SoC 520. For example, when the comparator is included in the first SoC 510, the first SoC 510 may receive the setting values (or the calculation values) from the second SoC 520, perform a comparison operation using the received setting values (or the calculation values), and provide a comparison result to the second SoC 520. Alternatively, when the comparator 540 is included in the second SoC 520, the second SoC 520 may receive the characteristic information (the operation values) from the first SoC 510 and correct the setting values.

The setting values corrected according to the example described above may be used in the autonomous driving function thereafter, and accordingly, the correction may be performed so that vehicle control characteristics of the autonomous driving system are the same as or similar to the driver's manual driving characteristics in the same circumstance and condition. In addition, the driver's manual driving characteristics in various circumstances and conditions may be accumulated and averaged, and the correction operation may be iterated to correct driving characteristics of the autonomous driving system to be further similar to the driver's driving habit.

Figure 5:
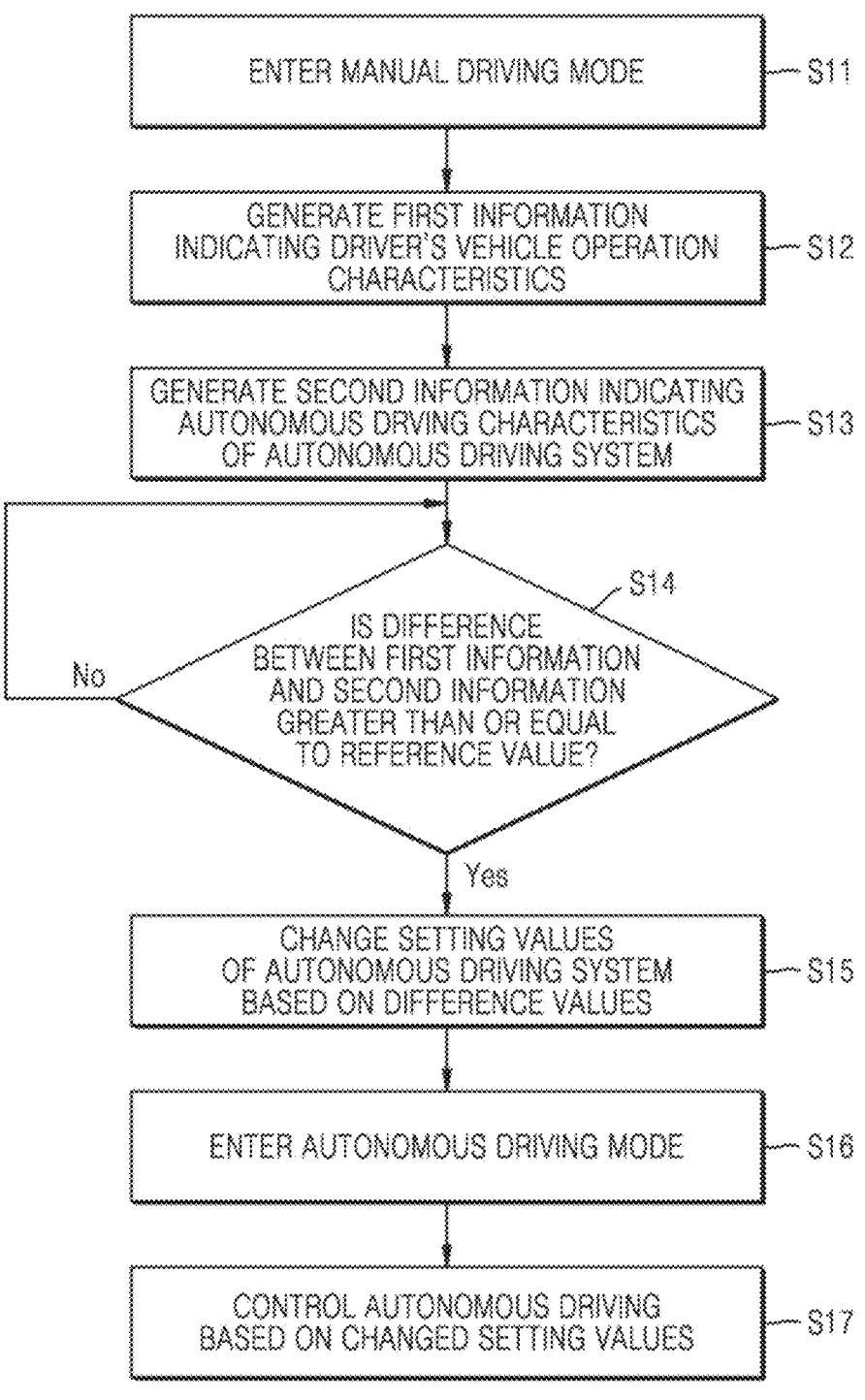
FIG. 5 is a flowchart illustrating an operating method of an autonomous driving system, according to an embodiment.

FIG. 5 is a flowchart illustrating an operating method of an autonomous driving system, according to an embodiment.

Referring to FIG. 5, a driver may select an autonomous driving function while driving a vehicle, for example, select any one of the plurality of autonomous driving levels defined in the embodiments described above. In addition, when the autonomous driving function is not selected by the driver, the vehicle may enter the manual driving mode in operation S11.

The autonomous driving system may include at least two vehicle SoCs, and any one SoC (e.g., a first SoC) may generate first information indicating the driver's manual driving characteristics according to the driver's manual operation information in operation S12. For example, the first SoC may receive sensor information from various sensors capable of operating in association with the autonomous driving function, and the first information may include pieces of information indicating characteristics of the driver who operates devices in the vehicle in a certain condition while driving, the certain condition being determined from the sensor information.

In addition, a second SoC as another SoC included in the autonomous driving system may perform its own operation processing related to the autonomous driving function in the manual driving mode, and accordingly, the second SoC may generate second information indicating autonomous driving characteristics in operation S13. For example, when the same systems in the vehicle are controlled, system control characteristics according to the driver's manual driving characteristics and system control characteristics by the autonomous driving system may be determined.

The first SoC and the second SoC may exchange the generated pieces of information with each other, and any one SoC (e.g., the second SoC) may perform a comparison operation between the first information and the second information in operation S14. Each of the first information and the second information may have certain values including, for example, a distance value between vehicles when a brake is operated, an acceleration value in a certain circumstance, and a steering angle in the certain circumstance. In an embodiment, if a difference between the first information and the second information is less than a certain reference value, it is determined that the manual driving characteristics are similar to the autonomous driving characteristics, and thus, setting values related to the autonomous driving function may be maintained without being corrected.

Otherwise, if the difference between the first information and the second information is greater than or equal to the certain reference value, it is determined that the manual driving characteristics are different from the autonomous driving characteristics, and thus, various kinds of setting values of the autonomous driving system may be changed based on difference values between the first information and the second information in operation S15 to perform a correction operation so that the autonomous driving characteristics are similar to the manual driving characteristics. Setting values to which the correction is reflected may be updated and stored in the autonomous driving system, and thereafter, when the autonomous driving function is selected by the driver, the vehicle may enter an autonomous driving mode in operation S16, and the autonomous driving system may control autonomous driving by using the changed setting values in operation S17.

In the embodiments described above, it has been described that manual driving characteristic information is determined based on a driver's manual operation information, and a determination operation may be performed in various manners. For example, a manual operation, such as sudden braking or sudden acceleration, occurring regardless of the driver's driving habit in a certain circumstance may be removed from information for correcting setting values. For example, the autonomous driving system may be implemented so that information according to the manual operation is not used in a correction operation if the difference between an operation value determined in the certain circumstance and the driver's operation value according to an average or a pattern is greater than the certain reference value.

Hereinafter, embodiments in which the autonomous driving system includes a storage and provides various kinds of information are described.

Figure 6:
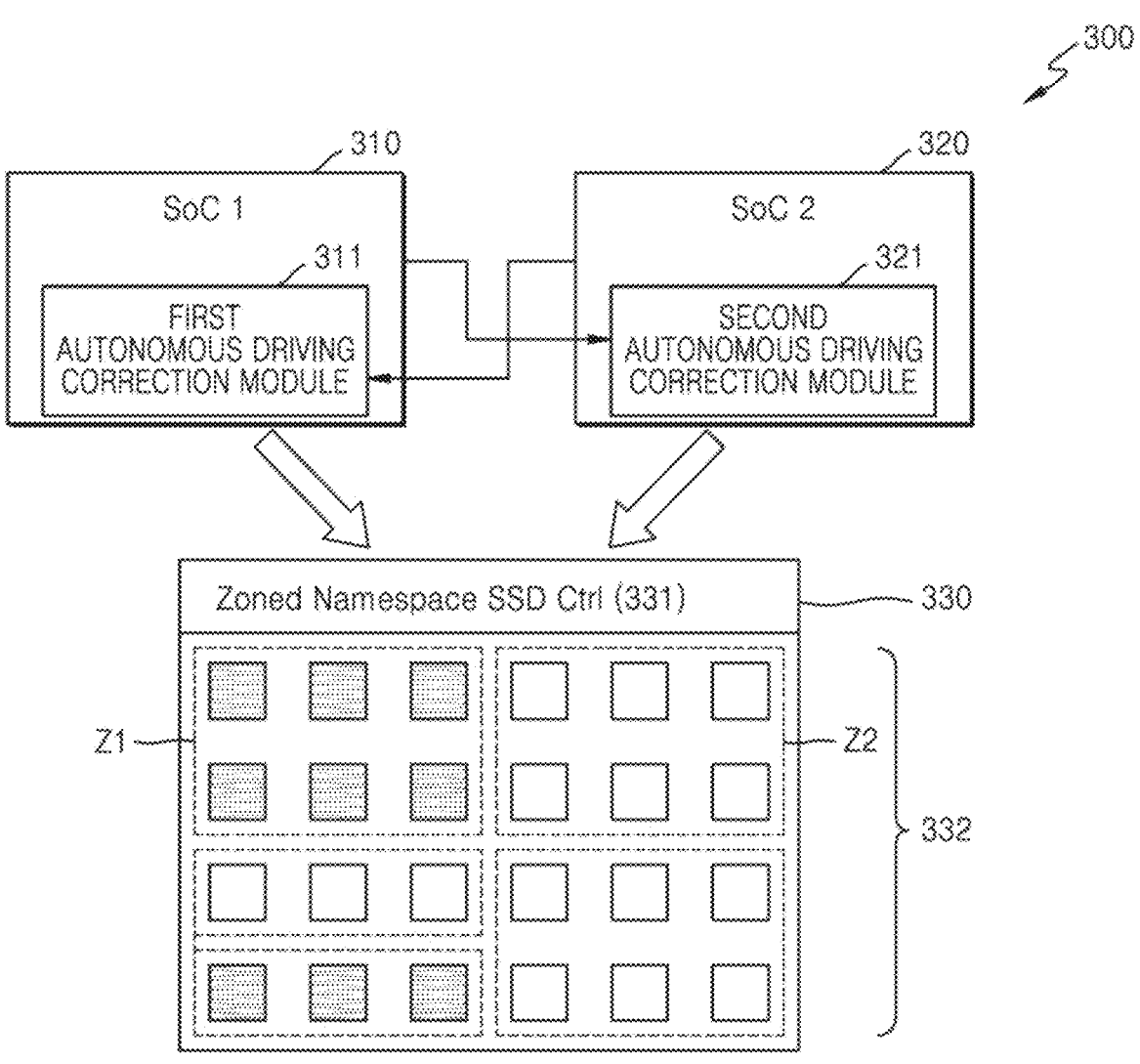
FIG. 6 is a block diagram illustrating an autonomous driving system according to other embodiments.

FIG. 6 is a block diagram illustrating an autonomous driving system 300 according to other embodiments.

Referring to FIG. 6, the autonomous driving system 300 may include a plurality of SoCs including a first SoC 310 and a second SoC 320, and similar to the embodiments described above, the first SoC 310 may include a first autonomous driving correction module 311 and the second SoC 320 may include a second autonomous driving correction module 321. When the first SoC 310 controls manual driving of a vehicle based on a driver's manual operation information, the first SoC 310 may provide manual driving characteristic information to the second autonomous driving correction module 321 and the second autonomous driving correction module 321 may perform the setting value correction operation of the embodiments described above. Alternatively, when the second SoC 320 controls manual driving of the vehicle based on the driver's manual operation information, the second SoC 320 may provide the manual driving characteristic information to the first autonomous driving correction module 311 and the first autonomous driving correction module 311 may perform the setting value correction operation of the embodiments described above.

According to an embodiment, the autonomous driving system 300 may further include a storage 330, and the storage 330 may include a solid state drive (SSD). In addition, as an example of the SSD, FIG. 6 illustrates a zoned namespace (ZNS) SSD. The storage 330 may include an SSD controller 331 and a memory device 332, the memory device 332 may include a plurality of namespaces, and the plurality of namespaces may be divided into at least two zones. For example, each of a first zone Z1 and a second zone Z2 may include one or more namespaces, and each namespace may include one or more flash cell blocks. In addition, each block in the memory device 332 shown in FIG. 6 may correspond to a namespace or a flash cell block.

In an embodiment, the first SoC 310 and the second SoC 320 may share the storage 330, the first zone Z1 of the storage 330 may be allocated to the first SoC 310, and the second zone Z2 of the storage 330 may be allocated to the second SoC 320. Accordingly, pieces of information related to an autonomous driving function performed by different SoCs may be respectively stored in different zones of the storage 330. For example, the first SoC 310 may sequentially store information related to autonomous driving in namespaces allocated to the first zone Z1 of the storage 330. In addition, the second SoC 320 may sequentially store information related to autonomous driving in namespaces allocated to the second zone Z2 of the storage 330.

In addition, a data erase unit in the storage 330 may be variously set, and an erase operation may be performed in a zone unit for zones in the storage 330. In an embodiment, the first zone Z1 allocated to the first SoC 310 and the second zone Z2 allocated to the second SoC 320 may have the same erase period or different erase periods. According to the configuration described above, only information stored in a certain zone of the storage 330 may be processed in a certain circumstance, such as the occurrence of an accident, thereby easily identifying the cause of the accident and a subject of the accident, and a background operation, such as garbage collection, which may be frequently performed in a random write scheme, may be reduced, and thus, the access speed of write, read, and/or the like of relevant information in the autonomous driving function may be improved.

In an embodiment, in the manual driving mode, the first SoC 310 may store the manual driving characteristic information in the first zone Z1 of the storage 330 and the second SoC 320 may store autonomous driving characteristic information in the second zone Z2 of the storage 330. In addition, the manual driving characteristic information stored in the first zone Z1 may be provided to the second SoC 320, or the autonomous driving characteristic information stored in the second zone Z2 may be provided to the first SoC 310, and the first SoC 310 or the second SoC 320 may perform the correction operation of the embodiments described above.

Figure 7B:
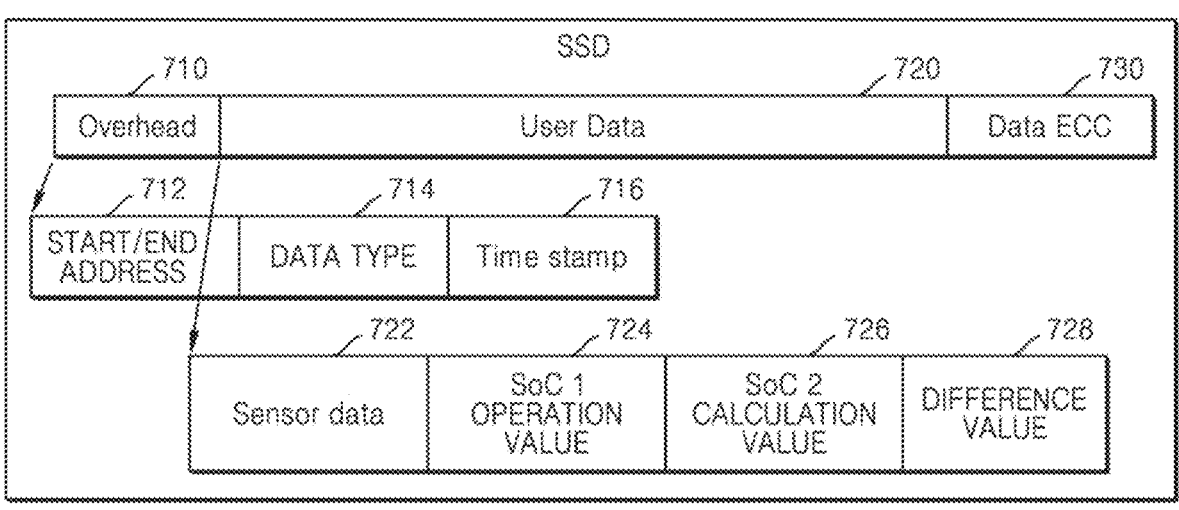
FIG. 7B illustrates an example of a packet structure for the information processing operation according to embodiments.

FIGS. 7A and 7B illustrate an example of an information processing operation according to embodiments. FIG. 7A shows an example of table information 600 including a plurality of entries which may be stored in an SoC, and FIG. 7B shows an example of a certain packet structure 700 stored in a storage.

FIG. 7A illustrates a case in which a distance between vehicles when a brake is operated, as any one item included in the table information 600, corresponds to a driving condition, and manual driving characteristic information, autonomous driving characteristic information, a difference value, and time information corresponding to the driving condition are included in the table information 600. For example, various conditions related to driving may be determined based on pieces of sensor information, and each of first and second SoCs may process the pieces of sensor information to determine a distance between vehicles when the brake is operated.

When the first SoC generates the manual driving characteristic information, the first SoC may determine, through manual operation information, a distance between vehicles at a time point where a driver operates the brake, for example, determine that the driver operates the brake when the distance between vehicles is reduced within 70 m. In addition, when the second SoC generates the autonomous driving characteristic information, the second SoC may operate the brake when a distance between vehicles corresponds to a certain setting value according to an autonomous driving function, for example, operate the brake when the distance between vehicles is reduced to be within 80 m.

In an embodiment, the second SoC may receive the manual driving characteristic information from the first SoC and store the table information including the items shown in FIG. 7A. In addition, when the second SoC performs a correction operation, information about a calculated difference between the driver's operation value and a calculation value of an autonomous driving system may be stored. In addition, the second SoC may correct a setting value related to the autonomous driving function based on the calculated difference value. For example, the second SoC may perform a correction operation so that the setting value related to a distance between vehicles, which is to be used to operate the brake, has a value less than 80 in (or has a value close to 70 m).

Information included in each item of the table information 600 stored as described above may be converted into a data packet having a structure as shown in FIG. 7B and provided to a storage. For example, the second SoC may store, in the storage, the data packet including items as shown in FIG. 7A, and the first SoC may receive the data packet from the storage and correct setting values related to the autonomous driving function by using information included in the received data packet.

In an embodiment, the data packet may include an overhead field 710, a user data field 720, and a data error correction code (ECC) field 730. The overhead field 710 may include information related to the reliability of packet transmission, for example, include one or more pieces of information. For example, the overhead field 710 may include a start/end address of information 712 and a data type 714 included in the data packet, and time stamp information 716 as a value included in the table information 600 may be included in the overhead field 710.

In addition, the user data field 720 may include at least one item of the table information 600 shown in FIG. 7A, and for example, information about a driving condition indicated by sensor information (e.g., sensor data 722), a driver's operation value (e.g., SoC 1 operation value 724) calculated by the first SoC, a calculation value (e.g., SoC 2 calculation value 726) in the autonomous driving function, which is calculated by the second SoC, and information (e.g., difference value 728) corresponding to a difference between the operation value and the calculation value may be included in the user data field 720. In addition, the data ECC field 730 may include ECC parity information for correcting an error of a data packet to be transmitted. In an embodiment, when the first SoC reads a data packet stored in the storage, various kinds of information included in the data packet may be extracted through a decoding process on the data packet, and setting values related to the autonomous driving function in the first SoC may be corrected using the extracted various kinds of information.

Figure 8:
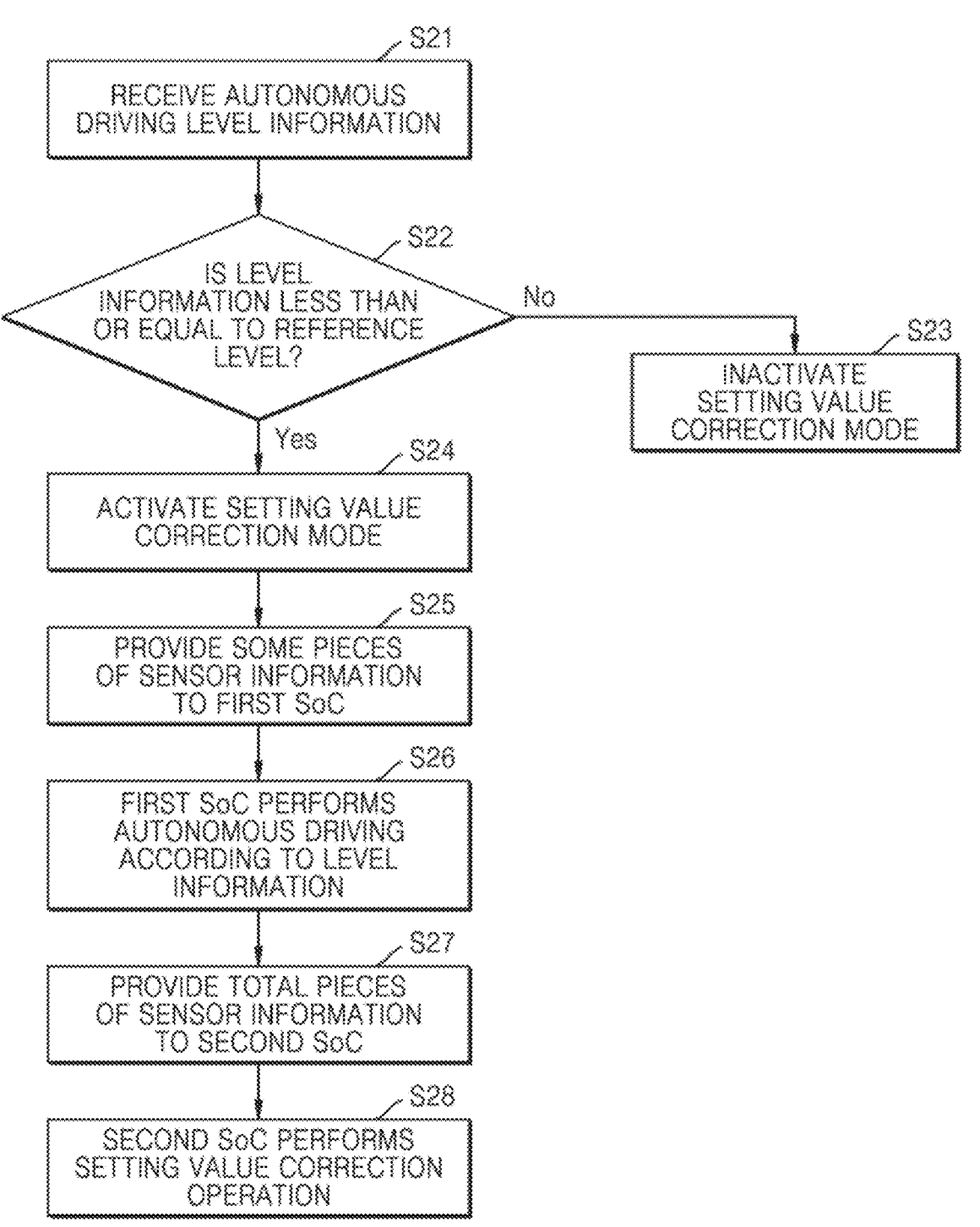
FIG. 8 is a first flow chart illustrating an operating method of an autonomous driving system, according to an embodiment.
Figure 10:
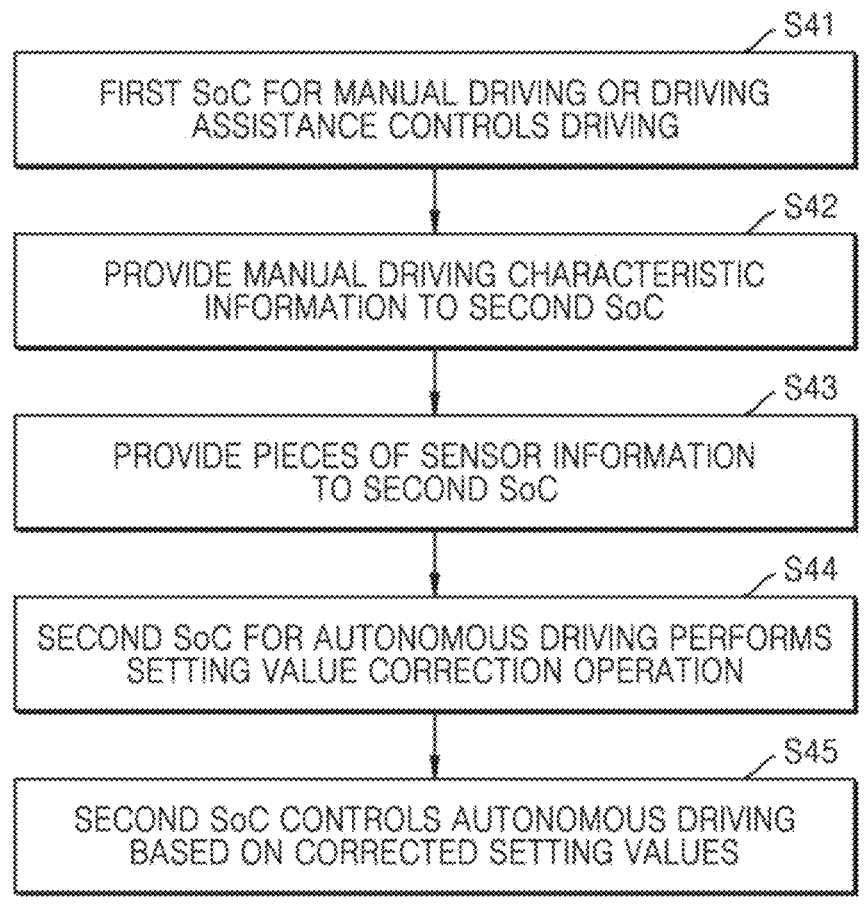
FIG. 10 is a third flow chart illustrating an operating method of an autonomous driving system, according to an embodiment.

FIGS. 8 to 10 are flowcharts illustrating an operating method of an autonomous driving system, according to an embodiment.

Referring to FIG. 8, the autonomous driving system may receive autonomous driving level information selected by a driver in operation S21. In addition, a degree in which the autonomous driving system involves a driving control while driving a vehicle may vary according to autonomous driving levels, and if an autonomous driving level lower than or equal to a reference level, at which most devices in the vehicle are operated by the driver, is selected, a setting value correction mode related to an autonomous driving function is activated in operation S24. Otherwise, if the selected autonomous driving level is higher than the reference level, the setting value correction mode may be inactivated in operation S23.

If the setting value correction mode is activated, some sensors used at the selected autonomous driving level among a plurality of sensors mounted on the vehicle may be activated, and some pieces of sensor information may be provided to a first SoC in operation S25. The first SoC may receive the some pieces of sensor information and perform autonomous driving according to the selected autonomous driving level in operation S26, and in addition, according to the embodiments described above, the first SoC may generate manual driving characteristic information based on the driver's manual operation information.

The second SoC may perform the setting value correction operation according to the embodiments described above. For example, the second SoC may receive all pieces of sensor information from the plurality of sensors mounted on the vehicle in operation S27. However, the embodiments are not limited thereto, and the same information as the some pieces of sensor information provided to the first SoC may be provided to the second SoC. Alternatively, the some pieces of sensor information from the some of the plurality of sensors may not be provided to the second SoC.

The manual driving characteristic information from the first SoC may be provided to the second SoC, and the second SoC may perform the setting value correction operation according to the embodiments described above in operation S28.

Referring to FIG. 9, according to the autonomous driving level selected by the driver, the autonomous driving system may perform only a driving assistance function for the driver's manual driving, and for example, the first SoC may perform the autonomous driving function and perform a driving assistance for the driver's manual driving. In addition, the first SoC may perform an assistance control of the vehicle based on a first setting value under a certain condition related to driving in operation S32. For example, when the driver does not operate a brake at a timing the brake is supposed to be operated during manual driving, the first SoC may perform an assistance control for operating the brake through a control based on the first setting value according to the autonomous driving function.

The second SoC included in the autonomous driving system may receive pieces of sensor information from sensors mounted on the vehicle and also receive the driver's manual operation information from the first SoC. The manual operation information may correspond to the manual driving characteristic information in the embodiments described above, and the second SoC may generate autonomous driving characteristic information as various kinds of information calculated through the autonomous driving function. The second SoC may perform an operation of correcting various kinds of setting values related to a vehicle control by comparing the manual driving characteristic information to the autonomous driving characteristic information in operation S34 and transmit the corrected setting values to the first SoC in operation S35.

The first SoC may perform an assistance control for the vehicle based on the corrected setting values and may perform an assistance control for the vehicle based on a second setting value corresponding to the corrected setting values in operation S36 under the same condition as in the aforementioned situation of performing the assistance control for the vehicle based on the first setting value. Accordingly, the first SoC may correct a vehicle control in real-time so that control characteristics are similar to the driver's driving habit, when performing an assistance control for the vehicle.

Referring to FIG. 10, the autonomous driving system may include the first SoC and the second SoC, and the first SoC may perform the driver's manual driving or a function of performing an assistance control for the vehicle at a certain autonomous driving level or lower. However, the second SoC may perform a function of performing autonomous driving of the vehicle at the certain autonomous driving level or higher.

According to a selection of the driver, the first SoC configured to perform manual driving or a driving assistance function for the vehicle is driven to control driving of the vehicle in operation S41. In addition, the first SoC may provide the manual driving characteristic information according to the embodiments described above to the second SoC in operation S42.

In addition, pieces of sensor information may be provided to the second SoC in operation S43, and the second SoC for autonomous driving may perform the setting value correction operation according to the embodiments described above in operation S44. Accordingly, the second SoC may correct setting values related to the autonomous driving function at a certain level or higher in parallel with performing the manual driving mode of the driver or the autonomous driving function at the certain level or lower under control by the first SoC, and then when the autonomous driving function is selected, the second SoC may control autonomous driving of the vehicle based on corrected setting values in operation S45.

Figure 11:
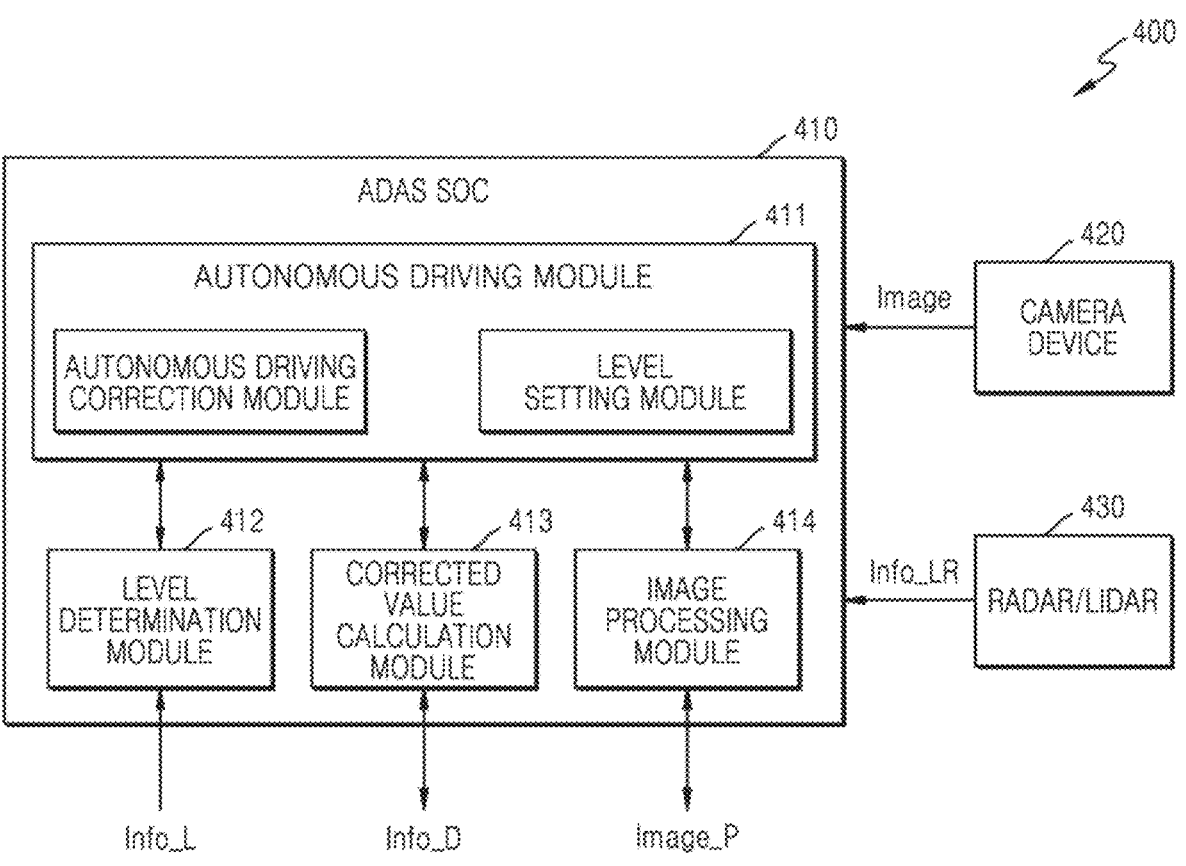
FIG. 11 is a block diagram illustrating an autonomous driving system including an advanced driver assistance system (ADAS) SoC, according to a modifiable embodiment.

FIG. 11 is a block diagram illustrating an autonomous driving system 400 including an ADAS SoC 410, according to a modifiable embodiment.

Referring to FIG. 11, the autonomous driving system 400 may include the ADAS SoC 410, at least one camera device 420, and at least one radar/LiDAR 430. The various kinds of sensors in the embodiments described above may include the at least one camera device 420 and the at least one radar/LiDAR 430, and various types of other sensors used for autonomous driving may be included in the autonomous driving system 400.

The ADAS SoC 410 may include an autonomous driving module 411, a level determination module 412, a corrected value calculation module 413, and an image processing module 414. In addition, the autonomous driving module 411 may include an autonomous driving correction module and a level setting module. According to embodiments, at least some of the various kinds of modules described above may be implemented by software, and the ADAS SoC 410 may include one or more processors configured to execute the software.

The level determination module 412 may determine whether the ADAS SoC 410 performs an autonomous driving function, based on level information Info_L related to an autonomous driving level. In addition, the level determination module 412 may determine whether the ADAS SoC 410 performs an autonomous driving correction function, based on the level information Info_L. The autonomous driving module 411 may set the autonomous driving level based on a result of the determination of the level determination module 412 and control the autonomous driving function according to the set autonomous driving level. In addition, when the autonomous driving correction function is performed, the autonomous driving module 411 may perform the autonomous driving function by using corrected setting values.

In addition, the corrected value calculation module 413 may calculate corrected setting values for various kinds of setting values related to the autonomous driving function based on the manual driving characteristic information Info_D provided from another SoC. The corrected setting values may be provided to the autonomous driving module 411 and used to correct the autonomous driving function.

The at least one camera device 420 may provide a captured image to the ADAS SoC 410 as image information image, and the at least one radar/LiDAR 430 may provide radar/LiDAR information Info_LR as sensing information related to a measured distance. The image processing module 414 may process the image information image from the at least one camera device 420 and provide a processed image Image_P to the outside. In addition, the image processing module 414 may detect/recognize an object included in the image information Image through a neural network operation according to the embodiments described above and provide a result of the detection/recognition to the autonomous driving module 411. The autonomous driving module 411 may control autonomous driving of a vehicle based on the result of the detection/recognition.

While non-limiting example embodiments have been particularly shown and described in the present disclosure, it will be understood that various changes in form and details may be made therein without departing from the spirit and scope of the present disclosure.

What is claimed is:

1. An autonomous driving system comprising:
a first system on chip (SoC) configured to receive, in a manual driving mode of a vehicle, pieces of sensor information from sensors mounted on the vehicle, and generate first information indicating manual driving characteristics of a driver by processing the pieces of sensor information and manual operation information generated when the driver operates the vehicle; and
a second SoC configured to receive the pieces of sensor information, generate, in the manual driving mode, second information comprising one or more setting values for controlling the vehicle according to an autonomous driving function, and correct in real-time the one or more setting values related to the autonomous driving function by comparing, in the manual driving mode, the first information to the second information,
wherein the first SoC is configured to activate, in the manual driving mode, a driving assistance function of assisting driving of the vehicle in a certain circumstance while driving,
wherein the first SoC is configured to generate the first information while the driving assistance function is active, and
wherein the first SoC is configured to receive the corrected one or more setting values from the second SoC, and perform the driving assistance function based on the corrected one or more setting values.

2. The autonomous driving system of claim 1, wherein the second SoC is configured to correct the one or more setting values such that the one or more setting values become closer to the manual driving characteristics of the driver.

3. The autonomous driving system of claim 1, wherein the first information comprises operation values of the driver for the vehicle, which are determined by the first SoC based on the pieces of sensor information in association with a certain condition while driving, wherein the second information comprises calculation values calculated by the second SoC to control the vehicle by the autonomous driving function in association with the certain condition, and wherein the second SoC is configured to compare the first information to the second information by calculating differences between the operation values and the calculation values.

4. The autonomous driving system of claim 1, wherein the first SoC is configured to provide the first information to the second SoC, and the second SoC is configured to provide the corrected one or more setting values to the first SoC.

5. The autonomous driving system of claim 4, wherein the first SoC or the second SoC is configured to perform, based on an autonomous driving mode being selected by the driver, the autonomous driving function based on the corrected one or more setting values.

6. The autonomous driving system of claim 4, wherein the second SoC is configured to store table information comprising a plurality of items, and wherein each of the plurality of items comprises an operation value of the driver for the vehicle under a certain condition while driving, a calculation value calculated to control the vehicle by the autonomous driving function, a difference between the operation value and the calculation value, and time stamp information indicating an occurrence time of the certain condition.

7. The autonomous driving system of claim 1, wherein the first SoC and the second SoC are configured to access an external storage, the first SoC is configured to store the first information in the external storage, and the second SoC is configured to receive the first information from the external storage and store the corrected one or more setting values in the external storage.

8. The autonomous driving system of claim 7, wherein the external storage comprises a zone namespace solid state drive (ZNS SSD) comprising a plurality of zones, each of the plurality of zones comprises one or more namespaces, a first zone among the plurality of zones is allocated to the first SoC, and a second zone other than the first zone is allocated to the second SoC.

9. The autonomous driving system of claim 7, wherein the second SoC is configured to store a packet having a certain data structure in the external storage, wherein the packet comprises a first field corresponding to an overhead area, a second field corresponding to a user data area, and a third field corresponding to a data error correction code (ECC) area, and wherein the second field comprises information indicating a certain condition while driving, an operation value for the vehicle under the certain condition, a calculation value calculated to control the vehicle by the autonomous driving function, and information about a difference value between the operation value and the calculation value.

10. An operating method of an autonomous driving system for controlling an autonomous driving function of a vehicle that comprises a plurality of sensors, the operating method comprising:

generating, by a first system on chip (SoC), one or more operation values indicating manual driving characteristics of a driver during manual driving of the vehicle by the driver;

generating, by a second SoC and based on pieces of sensor information from the plurality of sensors during the manual driving, one or more setting values related to control of the vehicle according to the autonomous driving function;

determining differences between the one or more operation values of the driver and the one or more setting values according to the autonomous driving function during the manual driving;

correcting, based on a result of the determining the differences, the one or more setting values such that the one or more setting values become closer to the manual driving characteristics of the driver; and controlling autonomous driving of the vehicle based on the corrected one or more setting values in an autonomous driving mode in response to selection of the autonomous driving function, wherein the first SoC is configured to activate, during manual driving, a driving assistance function of assisting driving of the vehicle in a certain circumstance while driving, wherein the one or more operation values are generated while the driving assistance function is active, and wherein the first SoC is configured to receive the corrected one or more setting values from the second SoC, and perform the driving assistance function based on the corrected one or more setting values.

11. The operating method of claim 10, wherein the correcting comprises correcting the one or more setting values in real-time based on the differences between the one or more operation values and the one or more setting values.

12. The operating method of claim 10, further comprising providing, to the second SoC, first information comprising the one or more operation values, and wherein the correcting the one or more setting values is performed by the second SoC.

13. The operating method of claim 10, further comprising providing, to the first SoC, the one or more setting values, wherein the correcting the one or more setting values is performed by the first SoC.

14. The operating method of claim 10, wherein the first SoC and the second SoC are configured to access an external storage, and the operating method further comprises:

storing, in the external storage, the one or more operation values generated by the first SoC; and providing, to the second SoC, the one or more operation values from the external storage, wherein the correcting the one or more setting values is performed by the second SoC.

15. The operating method of claim 10, wherein the correcting comprises correcting, based on an autonomous driving level that is selected by the driver being lower than or equal to a predetermined level, the one or more setting values based on the one or more operation values, and wherein the generating and the correcting the one or more setting values comprises generating and correcting, by the second SoC, the one or more setting values while the first SoC is controlling autonomous driving according to the manual driving by the driver and the autonomous driving level that is selected.

16. The operating method of claim 15, wherein the controlling the autonomous driving comprises causing the second SoC to control the autonomous driving based on the autonomous driving level that is selected by the driver being greater than the predetermined level.

17. A system on chip (SoC) comprising:

at least one processor; and a memory storing at least one computer program that, when executed by the at least one processor, is configured to:

control an autonomous driving function of a vehicle;

correct, in a manual driving mode of the vehicle, one or more setting values for controlling the vehicle according to the autonomous driving function, based on comparing first information to second information, wherein the first information indicates manual driving characteristics of a driver of the vehicle and is generated by processing manual operation information generated when the driver operates devices of the vehicle in the manual driving mode, wherein the second information comprises the one or more setting values, wherein the at least one computer program, when executed by the at least one processor, is further configured to, in the manual driving mode:

perform a driving assistance function of controlling the vehicle in a certain circumstance in the manual driving mode;

generate the first information while the driving assistance function is active;

provide the first information to an external SoC that is configured to correct the one or more setting values, receive the corrected one or more setting values; and change characteristics for controlling the vehicle in the driving assistance function in real-time based on the corrected one or more setting values that are received from the external SoC.

18. The SoC of claim 17, wherein the first information comprises information received from an external SoC, wherein the at least one computer program, when executed by the at least one processor, is further configured to cause the SoC to obtain a packet that is stored in an external storage, and wherein the packet comprises the first information, the second information, and difference values between the first information and the second information, which are used for correcting the one or more setting values.

* * * * *